United States Patent [19]

Okerblom

[11] Patent Number: 5,054,516
[45] Date of Patent: Oct. 8, 1991

[54] AUTOMATIC FLOW CONTROL VALVE

[75] Inventor: Charles L. Okerblom, Cranston, R.I.

[73] Assignee: Taco, Inc., Cranston, R.I.

[21] Appl. No.: 334,815

[22] Filed: Apr. 4, 1989

Related U.S. Application Data

[63] Continuation of Ser. No. 203,525, May 24, 1988, abandoned, which is a continuation of Ser. No. 923,871, Oct. 28, 1986, abandoned.

[51] Int. Cl.$^5$ .............................................. G05D 7/01
[52] U.S. Cl. ................................. 137/504; 137/556.3; 251/250.5
[58] Field of Search ............... 137/504, 524, 530, 501, 137/637.4, 614.17, 556.3; 251/337, 250.5, 249.5

[56] References Cited

U.S. PATENT DOCUMENTS

| | | | |
|---|---|---|---|
| 957,097 | 5/1910 | Restucci | 251/249.5 X |
| 1,459,939 | 6/1923 | Urtubees | 137/524 X |
| 1,797,118 | 3/1931 | Beach | 251/250.5 X |
| 2,059,363 | 11/1936 | Kimball | 137/637.4 X |
| 2,079,915 | 5/1937 | Midyette | 137/503 |
| 3,590,861 | 7/1971 | Chittenden et al. | 137/501 |
| 3,752,183 | 8/1973 | Griswold | 137/504 |
| 3,872,884 | 3/1975 | Busdiecker et al. | 137/504 X |

FOREIGN PATENT DOCUMENTS

| | | | |
|---|---|---|---|
| 89507 | 8/1960 | Denmark | 137/614.17 |
| 1116613 | 11/1961 | Fed. Rep. of Germany | 137/637.4 |

*Primary Examiner*—Stephen M. Hepperle
*Attorney, Agent, or Firm*—Bradford E. Kile; Kevin M. O'Brien; Ruffin B. Cordell

[57] ABSTRACT

An automatic flow control valve according to the instant invention maintains a constant flow rate despite varying fluid pressure, and employs a dual outer and inner cup construction through which a range of flow rates can be accommodated via a change in the orientation between the outer and the inner cup. Two modes of implementation are disclosed. In one mode, the adjustment of the orientation between the cups to correspond to a desired flow rate is made prior to assembly and installation. In the other mode, an external adjustment means is provided for altering the relative orientation between the outer and the inner cup at field and after assembly and installation. In a third mode, the flow rate can be adjusted on a fully assembled valve at any time other than when said valve in installed in a process line. Additionally, a means for adjusting the preload of a range spring balancing the cups is also provided. In a further embodiment, a corrosive resistent split ring member is included as a valve component which is firmly held in a inwardly raised section of the pipe housing in which the valve is inserted and which wraps around the outer cup as an intermediate member between the outer cup and the inside surface of the pipe housing. In this manner, corrosion of the pipe housing will not obstruct motion of the outer and inner cups.

15 Claims, 8 Drawing Sheets

AUTOMATIC FLOW CONTROL VALVE

This application is a continuation of application Ser. No. 07/203,525, filed May 24, 1988, now abandoned, which is a continuation of application Ser. No. 06/923,871, filed Oct. 28, 1986, now abandoned.

BACKGROUND AND FIELD OF INVENTION

This invention relates to automatic flow control valves. Valves of this type maintain a constant flow rate through a range of varying fluid pressures. A major drawback of the prior art has been that the structure of certain valve components would only accommodate a particular flow rate, and a multitude of valve components of different structural design were required in order to accommodate a range of desirable flow rates. Furthermore, once assembled and installed, no practical means is available to alter flow rates. The novel design and construction of an automatic flow control valve in accordance to the instant invention provide a plurality of flow rate requirements can be accommodated by a single valve construction.

OBJECTIVES OF THE INVENTION

It is an objective of the instant invention to provide an infinitely adjustable flow rate over a broad turn-down ratio.

It is still a further objective of the instant invention to provide an automatic flow control valve employing a range spring for which the preload force may be precisely controlled.

It is a still further objective of the instant invention to provide an automatic flow control valve for which the range spring may be removed in the field thereby permitting the substitution of another spring of different range.

It is a still further objective of the instant invention to provide for adjustability of flow rate in the field after process system installation.

It is a still further objective of the instant invention in several variations to provide for flow rate adjustability at any time other than when the valve is installed in the process line.

SUMMARY OF THE INVENTION

The instant invention includes outer and inner cup components having inter-related peripheral porting for fluid passage through an automatic flow control valve. The cups move along the valve axial centerline in response to a variable pressure differential which exerts a force to compress a range spring a predetermined amount for a given pressure differential, thereby controlling the amount of port area exposed to flow, and in so doing, controlling the flow at the desired rate over the full pressure differential of the spring.

The radial orientation of the inner and outer cup may be varied to control the flow at any predetermined value over a very broad flow turndown ratio. At maximum flow rate, the flow area through the cup set corresponds to that of the outer cup. To reduce the flow rate, the inner cup is rotated within the outer cup, thereby reducing the flow area over the full length of the ports so as to maintain a constant flow rate over the full pressure differential range, at any point in the turndown ratio range.

There are two major classifications of flow adjustment. External adjustment is the preferred variation for automatic flow control valves having means for side entry in the housing for a suitable adjusting mechanism. The internally adjustable variation can be provided for any type of housing as for example, casting, copper tubing, pipe nipple, etc. In the externally adjustable variation, the preferred embodiment has the outer cup keyed to the housing to prevent turning but leaving the cup free to move back and forth along the axial centerline of the valve. On the downstream side, the cup is flanged to interface with the upstream end of the range spring. There is a clearance hole at the center of the outer cup dome. The inner cup is free to turn radially within the outer cup. At the center of the dome of the inner cup is a hole so shaped as to have a keyed slip fit interface with a center pin. This center pin fixes the radial position of the inner cup to the outer cup, while still permitting the cup set to move back and forth along the axial centerline of the control valve. The center pin is fixed by suitable means to an outer ring component which is spring loaded into a groove in the housing inside diameter. Said outer ring has teeth cut into the edge. The housing has an entry port, suitably located for a turn down ratio shaft which has a gear face on the internal end. Said gear face engages the teeth of said ring such that rotation of the shaft results in rotation of the ring, thereby controlling the position of the inner cup relative to the outer cup. Externally, the turn down shaft projects through the housing and a bolt down calibration plate to engage a suitable calibration dial which is keyed to turn with the shaft to indicate flow rate. The internally adjustable variations have means for internally calibrating the cup-to-cup relationship and means for locking the cups in the desired relationship, prior to installation of the valve into the piping system.

Control of the spring preload force is critical to the accuracy of the flow control valve at or near the low end of the pressure differential range. Heretofore preload force was not controlled, or it was crudely controlled by placing washers behind the spring in a fixed length cavity. The instant invention provides means for precisely controlling spring preload force by employing a spring adjuster and varying the length of the spring cavity as required by the specific spring. Further, because the adjuster is removable, springs may be removed and others substituted at any time when the valve is not installed in the process line. An added advantage is that the valve may be completely disassembled for cleaning or for substituting new parts when required.

Within this type of valve there is a key surface which must be of corrosion resistant material if the valve is to function properly. The surface involved is the housing inside diameter which pilots the cup set. When the housing is made of a corrosion resistant material, that surface is an integral part of the housing. When the housing is made of a material which is subject to corrosive attack, a corrosion resistant lining material is required. Experience has shown that plating is not adequate for this purpose. While it is obvious that there are a number of ways to line this surface, the preferred way is the thin wall liner which this invention disclosure teaches.

DETAILED DESCRIPTION

Figure 1:
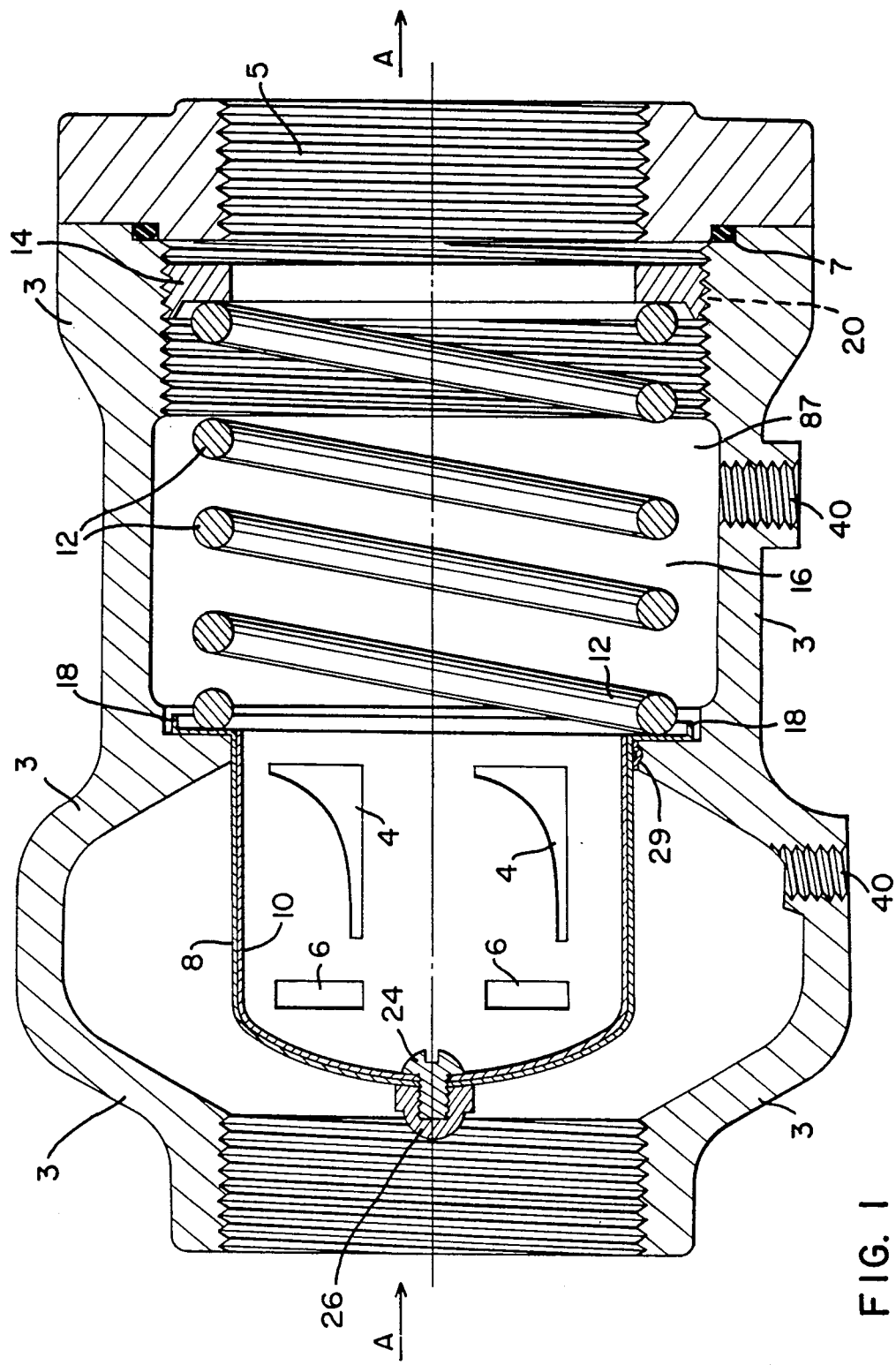
FIG. 1 is a cross-sectional view of a typical automatic flow control valve with screwed ends and internally adjustable cup set and adjustable spring preload.

Referring now to the drawings wherein like numerals indicate like parts, the subject invention will be discussed in detail. As shown in FIG. 1, fluid flows through an automatic flow control means axially positioned within a pipe housing 3, in which fluid direction is indicated by arrow "A". In this manner, fluid travels from an upstream side to a downstream side of the valve 2 only through flow ports 4 and 6. The valve 2 includes an outer cup 8 and inner cup 10 respectively having cup domes axially arranged invertedly to face the flow of fluid, and which are contiguously positioned in an overlapping manner relative to each other. A plurality of throttling flow ports and fixed area ports are present on both the outer cup 8 and the inner cup 10, and are correspondingly arranged to overlap in an infinitely variable preselected position over a very broad turn down ratio.

The more the overlap, the smaller is the available fluid passage from one side of the valve to the other. A range spring 12 having a predetermined preload and spring rate is positioned between a spring adjuster 14 fixed to the housing 3 and the down stream end of the outer and inner cup shaped elements 8 and 10.

A pressure differential across the dome of the cup set from the upstream side to the downstream side exerts a force which is opposed by the spring force. When said unbalanced force exceeds the preload force of the spring 12, the cup set moves in the downstream direction until a "null" condition is achieved between said opposing forces. In the process, a portion of the throttling ports 4 and six are is shielded from flow, thereby exposing that portion of total port flow area required to maintain a constant flow rate at the preselected value for the pressure differential (P.S.I.) involved. All springs are designed such that when mated to appropriate port geometry, will maintain a constant flow rate over a predetermined pressure differential range. The cup set starts to move at the preload pressure (P.S.I., etc) and moves to the maximum retracted position at the high end of the pressure differential range, fully throttling the throttling ports in the process, while leaving the fixed flow ports exposed to flow.

FIG. 1 shows a cross sectional view of a typical automatic flow control valve with internally adjustable trim. The valve comprises a housing 3, an inner cup 10 and an outer cup 8 locked together in a predetermined radial position, and energized by a spring force exerted by the range spring 12. The spring 12 is precisely preloaded by a spring adjuster 14 which is screwed into a threaded position at the outlet with a threaded adapter flange 5. (This flange is not required in many other valve variations.) The valve 1 is shown with the spring 12 in the preload position and the throttling cup set ports 4 fully exposed to flow. It can be assumed that the pressure differential force across the cup set is below the spring preload force. It is permitted by design that the spring adjuster 14 can be unscrewed so that the valve 2 can be completely disassembled for cleaning, or for spring substitution with one having a different spring range, etc.

Also shown on one side of the axial centerline is a housing 3 with an installed housing pilot diameter ring 29 for improved corrosion resistance. This ring 29 is omitted on the opposite side of the centerline where it can be assumed that the housing 3 is a corrosion resistant material. While precise control of spring preload and means for free substitution of range springs are common practice in some types of actuating devices, this is the first time this technology has been applied to this type of automatic flow control valve.

Figure 2:
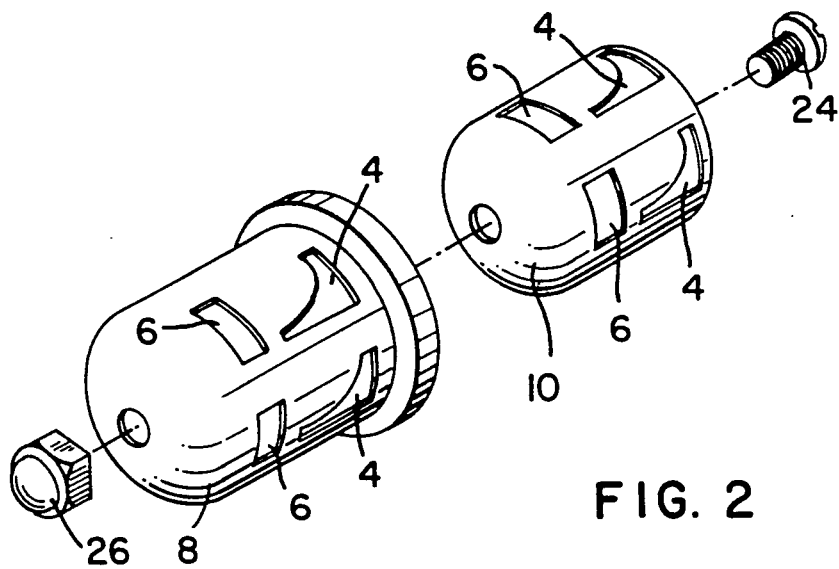
FIG. 2 is an exploded view of the cup set as shown in FIG. 1.

FIG. 2 is an exploded isometric view of the cup set shown in FIG. 1. The outer cup 8 has a series of peripheral port sets including fixed ports 6 and throttling ports 4 which when combined, have the maximum flow area provided for in the cup set. The flow characteristics is essentially equal percentage as it would be applied within the required range of pressure differential for constant flow rate. The inner cup 10 would also have a series of fixed ports 6 and throttling ports 4 around its periphery. The fixed ports 6 are essentially duplicates of the fixed ports 6 of the outer cup 8 though it should be pointed out that it is possible to jockey the flow areas of the fixed and throttling ports such that this is not necessarily so. The number of and the geometry of the throttling ports 4 of the inner cup 10 are not necessarily the same as those of the outer cup 8. While the designer has some latitude in what flow area is designated to a particular peripheral port set, the combined flow area must be such that when the inner cup 10 is rotated within the outer cup 8 would result in a constant flow rate over the design pressure differential range at all positions in the turndown flow range.

In the FIG. 2 embodiment, the flow rate must be determined before the valve 2 is installed in the process pipeline. This may be determined and adjusted at any station prior to installation. Means is provided for locking the cups (10 & 8) in any fixed relationship. Many ways of doing this are known to the inventor. For illustration purposes, but not by limitation, a nut 26 and a screw 24 are shown to perform the cup interlocking function. It should be noted that by changing the flow characteristic of the ports or by changing the load characteristics of the spring, it is possible to provide a controlled increase in flow rate with increasing pressure differential for use in other process control applications or to replace the spring entirely with a tubular spacer to provide a fixed pipeline restrictor which can be "tuned in" to provide any desired flow area.

With this feature, the automatic control valve of the instant invention can accommodate a variety of rate requirements with only a single valve structure construction; the only alteration that is needed is the pre-installation adjustment of the rotary orientation between the outer and the inner cup. The same pre-assembled unit can be made to have a variety of flow rate characteristics.

Figure 3:
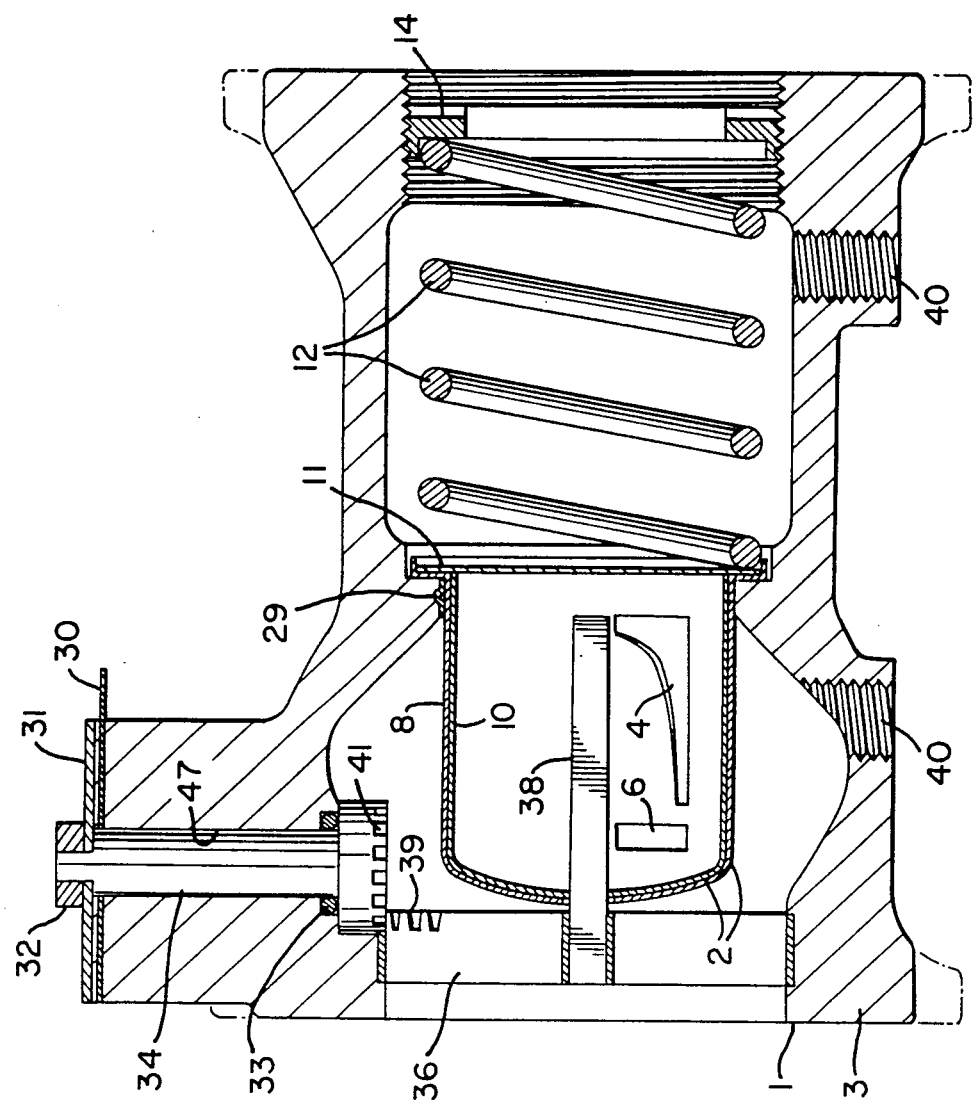
FIG. 3 is a cross-sectional view of a typical automatic flow control valve of the spacer type which has an externally adjustable cup set feature.

FIG. 3 shows a typical cross sectional view for an automatic flow control valve 1 of the spacer type and with means for external adjustment of the flow rate plus internal adjustment of the range spring 12. The valve 1 consists of a housing 3, a cup set 8 and 10, an inner cup retainer washer 11, a range spring 12, a spring adjuster 14, a center pin 38, a pin retainer ring 36, a turndown shaft 34, a turndown shaft seal 33, a calibration dial 30, a flow indicator 31, and a flow indicator retainer 32.

In practice, the turndown shaft 34 and shaft seal 33 are installed in the turndown shaft bore 47 of the housing 3. The pin retainer ring 36 and center pin 38 are spring load installed through the housing 3 inlet, taking care to insure that the gear teeth 39 of the pin retainer ring 36 engage the gear teeth 41 at the inner end of the turndown shaft 34 in the proper rotary orientation. When required, the housing pilot ring 29 is installed in the housing pilot ring bore 47 taking care to align the gap 46 in the pilot ring 29 with the groove 46 in said housing pilot ring bore 45. The cup set is assembled in proper radial orientation and including an inner cup 10 and an outer cup 8 is installed through the housing 3 outlet and down into the housing pilot ring 29 or pilot diameter 45, taking care to engage the center hole 19 of the inner cup 10 to the center pin 38 and the outer cup key 17 to the anti-rotation groove 46 of the housing 3. The cup retainer washer 11 is then installed to interface with the flange portion outer cup 8 so as to retain the inner cup 8 on its downstream edge. The range spring 12 is then installed through the valve 2 outlet so as to make contact with the face of the cup retainer washer 11. The spring adjuster 14 is then installed through the valve 2 and screwed down until it makes contact with the downstream face of the range spring 12. The spring preload is then adjusted as will be described later in this disclosure.

The calibration dial 30 is then fixed to the housing 3 by suitable means and in proper orientation at the outboard end of the turndown shaft 34. The flow indicator 31 is then installed on the end of the turndown shaft 34 so as to engage the flat 35 of said shaft 34 to prevent independent rotation. The flow indicator retainer 32 is then installed on the end of the downturn shaft 34 such that the flow indicator 31 is held firmly to prevent "play". When adjustment of flow rate is required said retainer 32 is removed and a suitable wrench is applied to the outer end of the turndown shaft 34 for rotation of said shaft 34 to the appropriate position as indicated by flow indicator 31/calibration dial 30 relationship. After calibration, the flow indicator retainer 32 is reinstalled to minimize random tampering.

Optionally, the valve 1 may be supplied with external connections 40 for use with pressure or temperature measurement devices or for purging foreign matter from the valve 2 cavities.

Functionally, the valve 1 operates as follows:

1) The flow rate is fixed by the turndown shaft 34 rotational position.

2) A pressure differential in excess of the minimum value of the spring range across the cup set 2 will exert a force across on the cup set 2 which will cause movement of said cup set 2 until a "null" condition is achieved with the opposing force provided by the range spring 12. In this process, the flow area through the combined fixed 6 and throttling 4 ports is adjusted by the cup set 2 movement to that which would provide the exact flow rate required for the pressure differential involved.

Figure 4B:
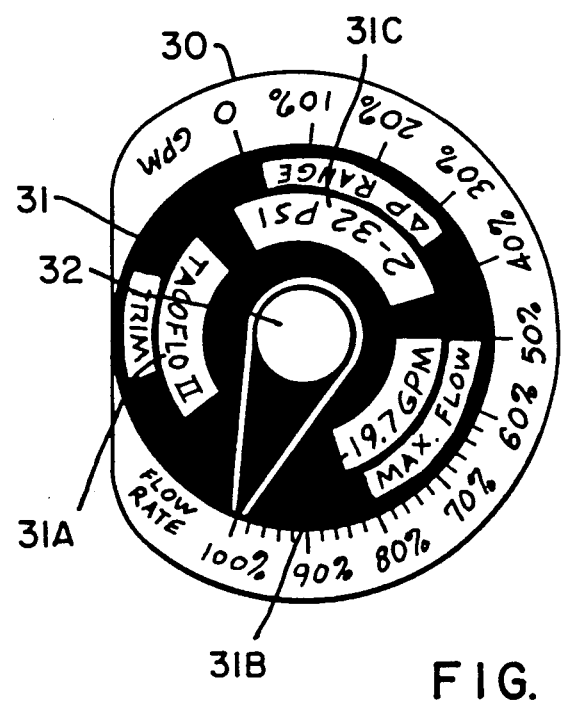
FIG. 4B shows a typical calibration dial set for indicating flow rate setting externally in accordance with the design variation shown in FIGS. 3 and 4A.
Figure 4A:
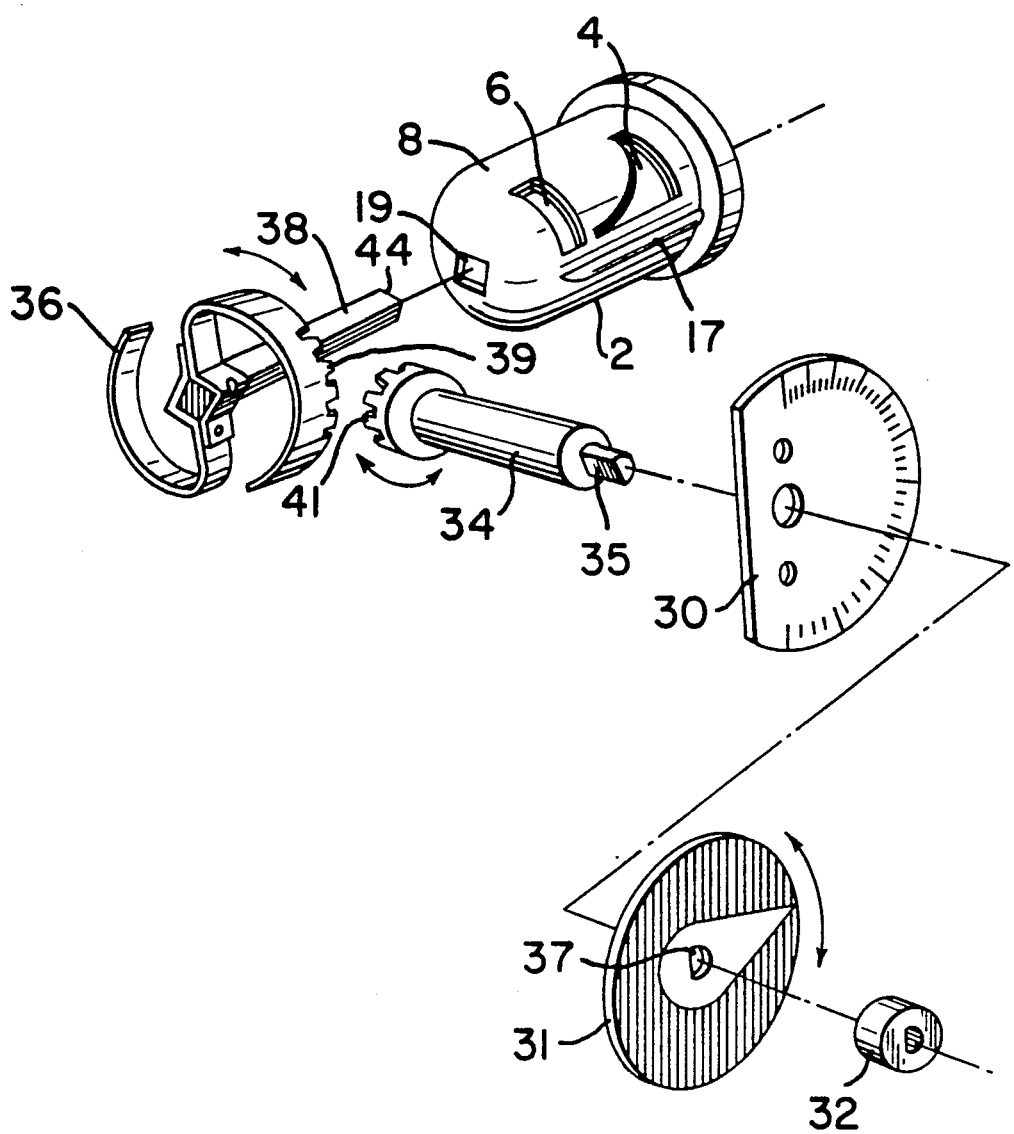
FIG. 4A is an exploded isometric view of the mechanism shown in FIG. 3 for externally adjusting the flow rate of the valve.

FIG. 4A is an exploded view of flow rate turndown mechanism shown in FIG. 3. The mechanism includes a turndown shaft 34 which is internally engaged to the pin retainer ring 36 by gear teeth 39 and 41 and externally keyed to the flow indicator 31 by suitable means. The pin retainer ring 36 is part of a subassembly which includes a center pin 38 with a cross sectional shape designed to prevent independent rotation of any close fitting bores engaged such as for example, the center hole 19 of the dome in the inner cup 10 and the center hole formed at sub-assembly of pin retainer ring 36 halves. The rotary position of the turndown shaft 34 fixes the rotary position of the pin retainer ring 36, the center pin 38, the inner cup 10, and the flow indicator 31.

By fixing the rotary position of the inner cup 10, the flow area through the fixed 6 and the throttling 4 ports are controlled to provide the predetermined flow rate. At the external end of the turndown shaft 34, the flow indicator 31 rotary position is fixed to show said flow rate. As stated previously, the flow rate may be adjusted externally at any time after valve 1 is assembled, and also after post piping system is installed.

FIG. 4B is a plan view of a typical externally adjustable calibration system which is shown for illustrative purposes but not as a limitation of the instant invention since other calibration means may be used. The illustration shows the calibration dial 30 calibrated in a percentage of the maximum flow rate. The graphics of the flow indicator 31 show the position indicator 31A, the maximum flow rate 31B, and the installed spring range 31C. To determine the adjusted flow rate, one would multiply the maximum flow rate 31B as shown on the flow indicator 31 by the percentage shown on the calibration dial 30 at which the position indicator 31A is set.

Figure 5A:
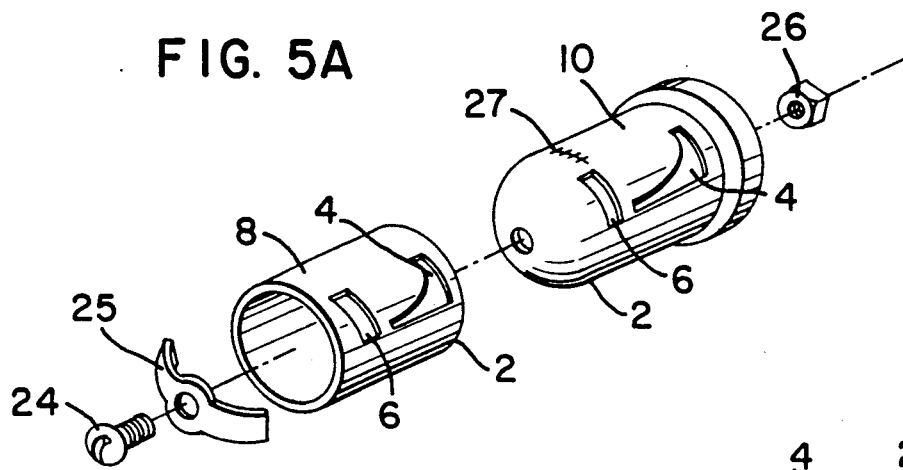
FIG. 5A is an exploded isometric view of an alternative construction for an internally adjustable cup set in which the outer cup is replaced by a sleeve and calibration marks are scribed on the periphery surface of the inner cup.

FIG. 5A is an alternative design to that shown in FIG. 2 for an internally adjustable cup set 2 in which the outer cup 8 has been replaced by a sleeve 8 having fixed flow ports 6 and throttling flow ports 4, plus a cup set locking strap 25, for maintaining the port turndown adjustment. The inner cup 10 has been modified to include the spring interface flange and calibration marks 27 on the outer surface which would be visible through the fixed port 6 of the outer sleeve 8 or any outer cup 8 of other design variations.

Figure 5B:
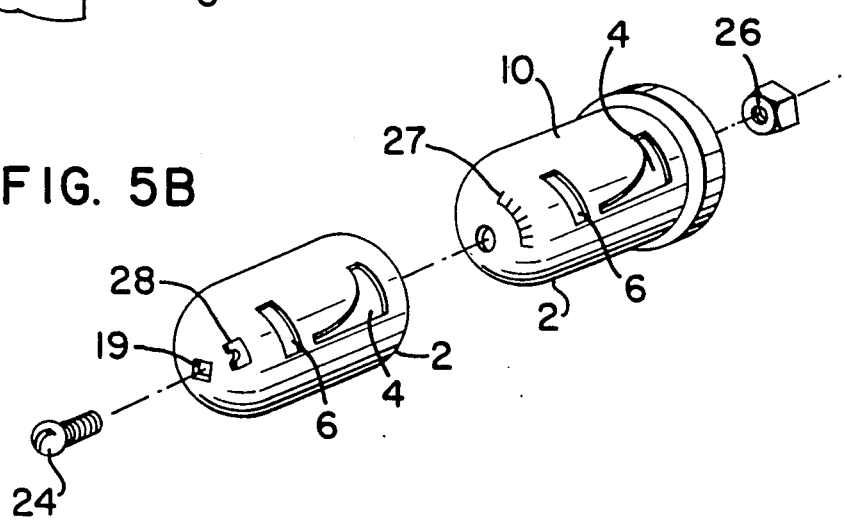
FIG. 5B is an exploded view of an alternative construction of an internally adjustable flow control cup set for which calibration means is built into the cup set dome, thereby permitting visual access through the inlet of a fully assembled valve for calibration purposes.

FIG. 5B is an alternative design to that shown in FIG. 2 for an internally adjustable cup set 2 in which the inner cup 10 has the spring interface flange integral and calibration marks 27 for adjustment purposes on the dome. The outer cup 8 has the keyed center hole 19, and a window port with indicator 28 in the dome for viewing the calibration marks 27 in the dome of the inner cup 10. This design permits flow adjustment of a fully assembled valve 1 prior to installation in a piping system and eliminates the need for a cup retainer washer 11.

Figure 5C:
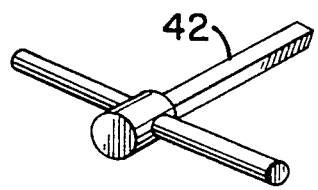
FIG. 5C is a typical calibration wrench of the type that would be used with the cup set shown in FIG. 5B.

FIG. 5C is a typical flow adjustment wrench 42 as would be used with the cup set shown in FIG. 5B for spring length variation. Precise adjustment of spring preload and substitution of springs with varying lengths are made possible in the context of automatic flow control valves.

Figure 7A:
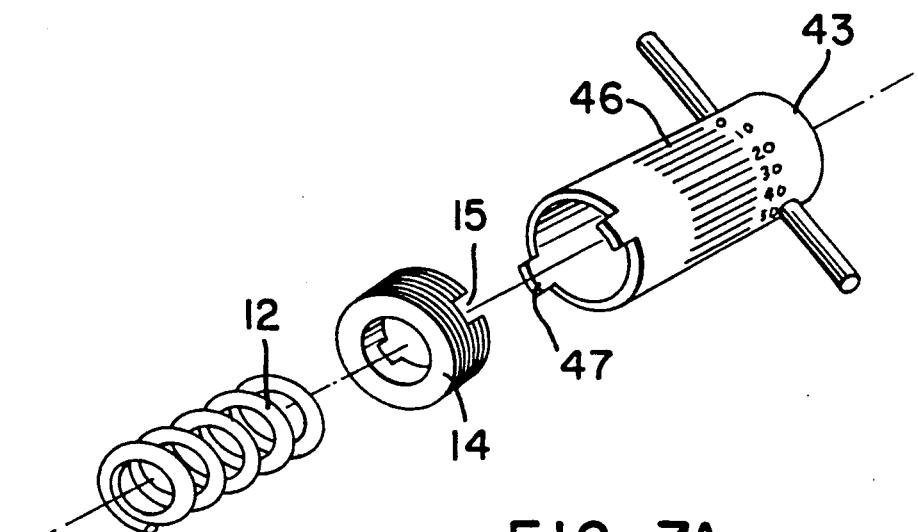
FIG. 7A is an exploded isometric view of the range spring, the spring adjuster, and a calibrated wrench for precisely controlling spring preload.

FIG. 7A shows a helical compression range spring 12 which interfaces with the downstream flange of the cup set 2 on the upstream end and the spring adjuster 14 on the downstream end. The spring adjuster 14 is threaded on its outside diameter to engage a threaded portion of the inside diameter of the housing 3. The spring adjuster has suitable means 15 for engaging a wrench 43 used for assembly and spring calibration purposes.

Figure 6:
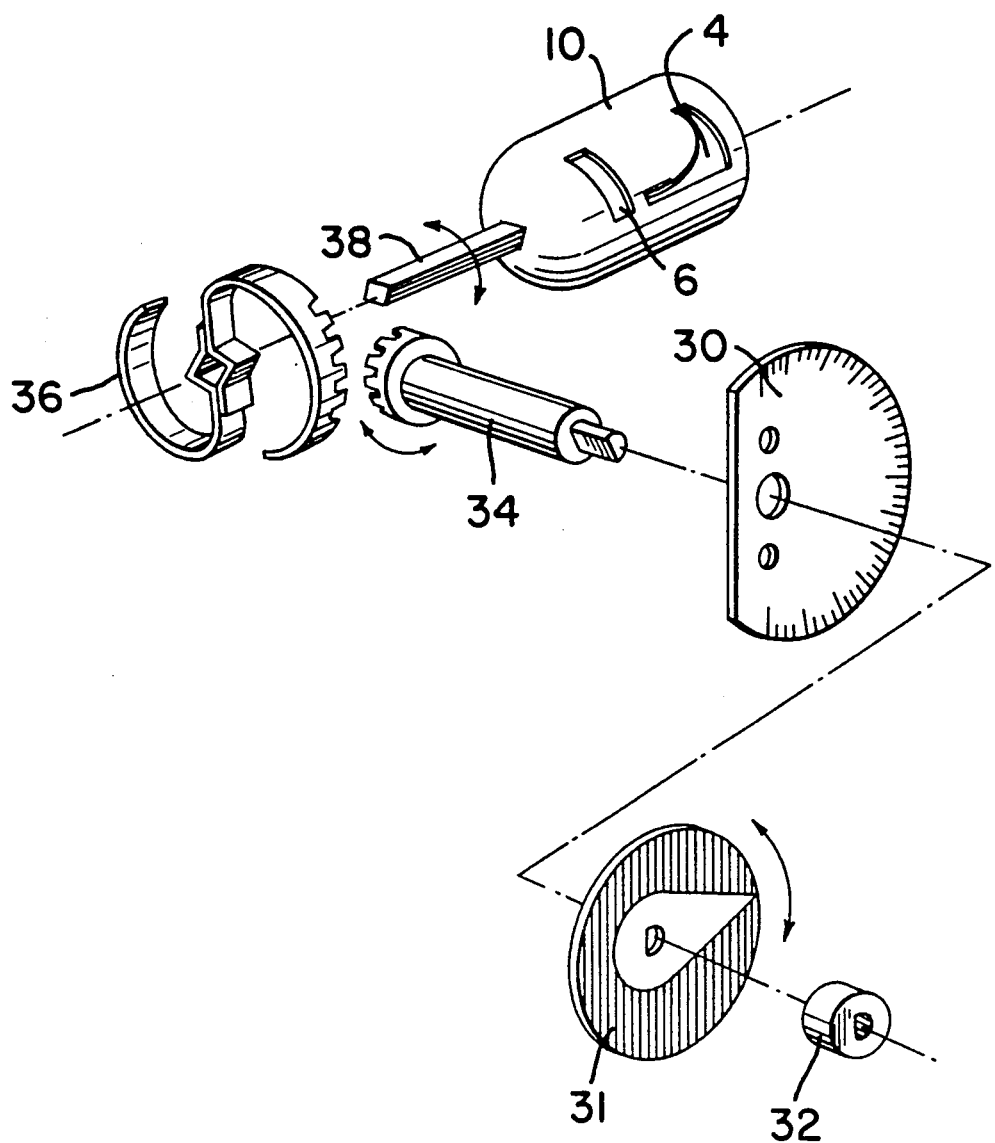
FIG. 6 is an exploded view of an alternative construction of an externally adjustable cup set in which the center pin is fixed to the inner cup, said center pin movable in reciprocating motion within a keyed center hole formed in appropriate retainer ring.

In practice, the spring 12 is installed through the housing 3 outlet and centered on the cup set 2 flange. The spring adjuster 14 is then screwed down into the housing 3 until contact is made with the spring 12 at its free length. At FIG. 6 is an alternative design to the externally adjustable cup set 2 shown in FIG. 4A in which the center pin 38 is no longer part of pin retainer ring 36 sub-assembly but is permanently fixed to the dome center of the inner cup 10 in proper radial orientation. The center pin 38 slides in a reciprocating motion through the fixed center hole of the pin retainer ring 36, in response to changes in pressure differential across the cup set 2. In other respects, it is similar to the mechanism shown in FIG. 4A.

FIG. 7A is an exploded view of the means of adjusting spring preload. In the context of the instant invention, the preload value of range spring is important because it has significant effect of the accuracy of flow rate of the valve. This is particularly true at the low end of the spring range where deviation would be the greatest.

Figure 7B:
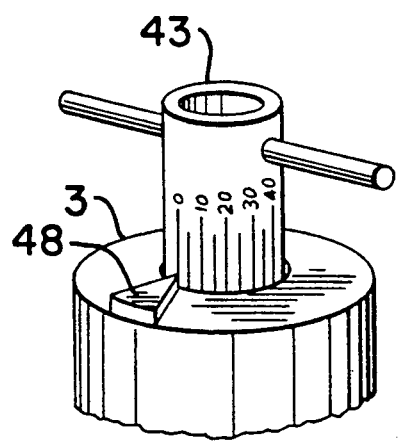
FIG. 7B is an isometric view of the spring adjusting wrench inserted into the valve outlet and engaged with the spring adjuster and with the calibration scale on said wrench aligned with a removable zero reference marker.

In practice, it is very difficult and expensive for spring manufacturers to hold both spring rate and spring length, so considerable tolerance in spring length is normal. Prior art automatic flow control valves of this type have either ignored the problem or provided crude control by adding washers to compensate this point. As shown, the zero reference marker 48 (in FIG. 7B) is lined up with the zero degree position of the wrench calibration dial 46. The wrench 43 is then turned a predetermined number of degrees to provide precise spring preload. Removal of the spring adjuster 14 would permit switching of springs 12 or complete disassembly of the valve for cleaning or substitution of spare parts purposes on an individual basis.

In some instances, automatic flow control valves have housings 3 which are made of material which is not corrosive resistant to the process media. This can lead to a "freeze up" between the cup set 2 and the pilot diameter 45 of the housing. Prior art solutions to the problem involved plating of parts or cartridge type modules in corrosive resistant materials which included the pilot surface. However, plated surfaces are prone to fail, and cartridge type modules are highly restrictive in terms of versatility and performance. When housing 3 is itself made of material that is corrosive resistant to the process media, the pilot diameter can be an integral part of the housing 3. In those cases wherein housing material is inadequate, an intermediate material would be required. An embodiment of the instant invention teaches the use of a formed cross sectional split ring 29 which is retained between the housing 3 at the pilot diameter 45 and the outside diameter of the cup set 2 to provide the required corrosion resistance.

Figure 9A:
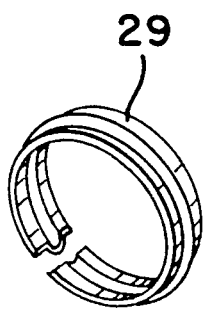
FIG. 9 is an isometric view of the housing pilot ring.
FIGS. 9B, 9C, and 9D are portional views of the housing pilot ring shown in FIG. 9A but with typical alternative cross sections.
Figure 8A:
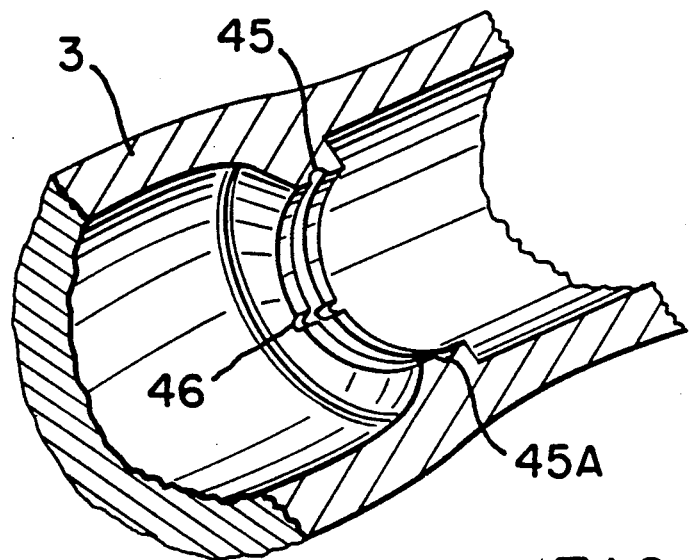
FIG. 8A shows an isometric view of a portion of a crosssection of a typical housing in which the cup pilot diameter has been prepared to receive a housing pilot ring.

FIG. 8A shows a cut-away view of a portion of a typical housing 3 in which the pilot diameter 45 has been machined to provide a retaining groove 45A for split ring 29. There is also a slot 46 at the pilot diameter 45 which acts to prevent the outer cup 8 from turning. The split ring 29 (in FIG. 9A) is inserted into the housing cavity and snapped into the pilot diameter 45 to engage the retaining groove 45A and to align the ends of the split ring 29 with the slot 46. This split ring should be formed of corrosive resistant material, such as suitable plastic or composite material having a lower coefficient of friction to permit movement of said outer sleeve or outer cup. Alternatively, it may be formed of corrosion resistant metal, or corrosion resistant metal with a corresponding surface treatment for lowering the coefficient of friction. A surface of lower coefficient of friction can enhance valve performance as cup or sleeve cocking and binding problems are alleviated by reduced friction. Alternatively, the problem may be resolved by increasing the length of guiding, for instance, in the externally adjustable mode, the center pin guiding may be increased.

Figure 8B:
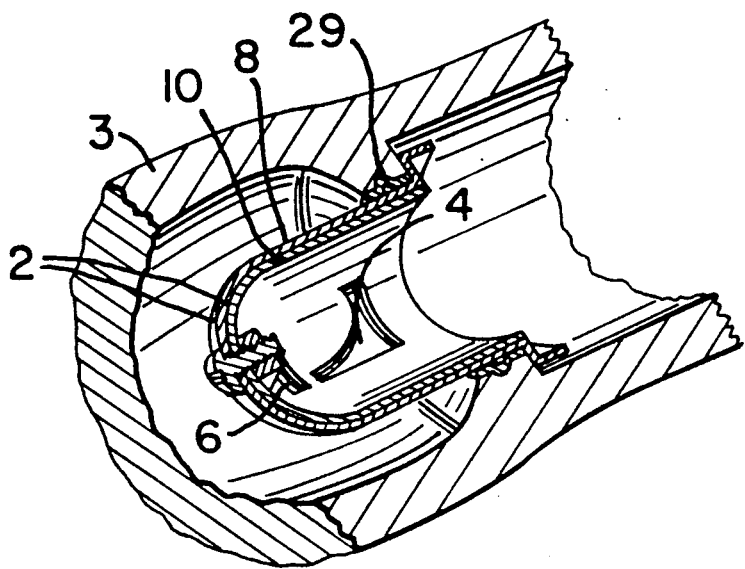
FIG. 8B shows the same housing portion as in FIG. 8A except that the pilot ring and cup set are shown in the installed position.

FIG. 8B shows the same portion of the housing 3 with the cup set 2 installed to trap the split ring 29 in the groove 45A.

Figure 9B:
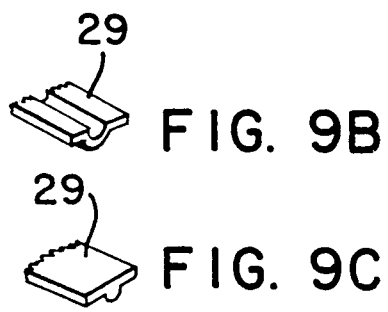
Figure 9C:
Figure 9D:
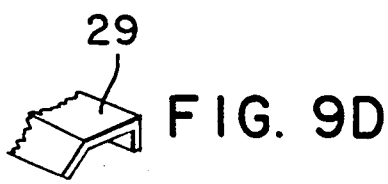

FIGS. 9B, 9C, and 9D are typical alternative split ring 29 cross-sections which are appropriate for this purpose. These are shown as illustrations and not as limitations as to the variety of split ring 29 cross sections which could be made suitable by appropriate machining of the housing pilot diameter 45.

SUMMARY OF THE MAJOR ADVANTAGES

In the context of automatic flow control valves which maintain a constant flow rate regardless of variations in fluid pressure, a spring regulated singular cup means has been known. However, a major problem has been that a different cup construction is required for each different flow rate desired. A further problem has been that the inside surface of the pipe housing in which an automatic flow control valve is inserted tend to corrode when exposed to the process media. A natural result of such corrosion is the obstruction of intended motion of the singular cup component, the so called "freeze out".

The dual cup type construction of the instant invention provides greatly enhanced efficiency as it eliminates the need for a different cup structure for each desired flow rate. The flexible accommodation provided by the instant invention further makes available two modes of adjustment to meet the needs of varying flow rate requirements. The first one is the internal variation mode which enables pre-assembly selection of the arrangement and orientation of the outer and the inner cup. The physical structure is the same for all flow rate requirements, only the relative orientation is changed. The other one is the external variation mode which provides for adjustment of the flow rate even after assembly and installation of the flow control valve, via an external means of adjustment. The single adjustable cup set design eliminates the need for a multiplicity of incremental step ported modules and the need for factory customized valves. Additionally, flow accuracy is increased by replacing incremental step customized valves with a combination that is infinitely adjustable within its turndown ratio and with precise control of the spring preload. Furthermore, the spring can be changed at any time other than when it is installed in a process system, and the automatic flow control valve can be completely disassembled for cleaning or for replacement of parts.

In a different embodiment of the invention, the automatic flow control valve additionally includes a corrosive resistant split ring which fits around the outer cup and is firmly held in place within a groove in a retainer section of the pipe housing. The corrosive resistant split ring constitutes the guiding contact between the outer cup and the pipe housing. The valve is separated from the inside surface of the pipe housing and thus the cup member(s) of the instant automatic flow valve will not be obstructed by corroding surface areas of the pipe housing.

Automatic flow rate regulation basing flow area on a flow efficiency factor and the square root of the pressure differential is well known and commonly applied throughout the process industries. However, what is new and innovatively different is the dual inner and outer cup concept in which the inner cup can be rotated so as to reduce the flow area in a controlled manner to maintain a constant flow rate within a predetermined pressure differential range, at any position within the turndown flow range. This represents a significant advantage over the prior art. It takes the valve out of the "factory built to order" mode, and makes it possible to apply larger lot production techniques to the product line, and permits field adjustment to precise service flow requirements. Prior art, factory set flow rates were made available in incremental steps, thereby introducing a deviation from the optimum flow rate. If an error was made in determining required flow rate, or if service requirements were changed, a replacement flow trim module would have been required.

In describing the invention, reference has been made to a preferred embodiment. Those skilled in the art, however, and familiar with the disclosure of the subject invention, may recognize additions, deletions, substitutions, modifications and/or other changes which will fall within the purview of the invention as defined in the following claims:

I claim:

1. An automatic flow control valve comprising:
   a generally cylindrical valve housing having an upstream end and a downstream end and having a reduced bore section intermediate said ends;
   said reduced bore section defined by an upstream surface, a downstream surface and an inner surface;
   a flow control set slidably received by said inner surface, said set including a first cup and an outer sleeve;
   said first cup having a cylindrical portion which includes at least one port hole of predetermined configuration for passage of fluid from the outside to the inside thereof;
   said outer sleeve having generally cylindrical shape disposed about said cylindrical portion of said cup and having at least one port hole of predetermined configuration which overlaps at least partially with said port hole of said first cup according to a predetermined arrangement so that fluid can flow through said holes;
   a range spring disposed between said downstream end and said set for biasing said set upstream;
   means to fixedly secure said first cup and said sleeve in fixed radial relationship with one another so that said cup and said sleeve can be positioned in predetermined relative orientations to adjust the degree of overlap of said port holes;
   wherein said means to fixedly secure include means responsive to operator manipulation to vary the orientation of said sleeve with respect to said cup so as to adjust the degree of overlap of said port holes.

2. An automatic flow control valve as recited in claim 1, wherein said at least one port hole of said sleeve and said cup respectively include at least one fixed port hole and at least one throttling port hole.

3. An automatic flow control valve as recited in claim 2, wherein said plurality of predetermined relative orientations are in rotational offset from each other, and said varying means is operative to rotate one of said outer sleeves and said cup relative to the other.

4. The automatic control valve of claim 1, wherein said first cup is closed at its upstream end forward with a first convex portion and said outer sleeve is formed with a second convex portion and said means to fixedly secure extends through said first and second convex portions.

5. The automatic control valve of claim 1, wherein said range spring is in engagement with a flange extending from a downstream end of said sleeve.

6. An automatic flow control valve comprising:
   a generally cylindrical valve housing having an upstream end and a downstream end and having a reduced bore section intermediate said ends;
   said reduced bore section defined by an upstream surface, a downstream surface and an inner surface;
   a flow control set slidably received by said inner surface, said set including a first cup and an outer sleeve;
   said first cup having a cylindrical portion which includes at least one port hole of predetermined configuration for passage of fluid from the outside to the inside thereof;
   said outer sleeve having generally cylindrical shape disposed about said cylindrical portion of said cup and having at least one port hole of predetermined configuration which overlaps at least partially with said port hole of said first cup according to a predetermined arrangement so that fluid can flow through said holes;
   a range spring disposed between said downstream end and said set for biasing said set upstream;
   means to fixedly secure said first cup and said sleeve in fixed radial relationship with one another so that said cup and said sleeve can be positioned in predetermined relative orientations to adjust the degree of overlap of said port holes;
   wherein said means to fixedly secure include means responsive to operator manipulation to vary the orientation of said sleeve with respect to said cup so as to adjust the degree of overlap of said port holes;

wherein said means to vary comprises:

a center pin axially inserted through said cup and said sleeve; said pin being loosely engaged with said cup in a guided relationship, and fixedly engaged relative to said cup;

a pin retainer ring through which a portion of said center pin outside of said cup is fixedly engaged, and operative to be rotationally driven via gear teeth located on at least one peripheral structure extending therefrom; and a turndown shaft having circularly arranged teeth engaging said teeth on said peripheral structure of said pin retainer ring, whereby rotation of said turndown shaft responsive to external force causes a corresponding rotation of said pin retainer ring and said center pin, resulting in rotation of said inner cup relative to said sleeve.

7. An automatic flow control valve as recited in claim 6, wherein said means to vary further includes a flow indicator means and a calibration dial means fixedly coupled to an outer end of said turndown shaft which in combination are operative to enable proper calibration of the turndown shaft and the exhibition of an effective flow rate.

8. An automatic flow control valve comprising:

a generally cylindrical valve housing having an upstream end and a downstream end and having a reduced bore section intermediate said ends;

said reduced bore section defined by an upstream surface, a downstream surface and an inner surface; a flow control set slidably received by said inner surface, said set including a first cup and an outer sleeve;

said first cup having a cylindrical portion which includes at least one port hole of predetermined configuration for passage of fluid from the outside to the inside thereof;

said outer sleeve having generally cylindrical shape disposed about said cylindrical portion of said cup and having at least one port hole of predetermined configuration which overlaps at least partially with said port hole of said first cup according to a predetermined arrangement so that fluid can flow through said holes;

a range spring disposed between said downstream end and said set for biasing said set upstream;

means to fixedly secure said first cup and said sleeve in fixed radial relationship with one another so that said cup and said sleeve can be positioned in predetermined relative orientations to adjust the degree of overlap of said port holes;

wherein said means to fixedly secure include means responsive to operator manipulation to vary the orientation of said sleeve with respect to said cup so as to adjust the degree of overlap of said port holes;

wherein said outer sleeve includes an antirotation key rib on its external peripheral surface for inhibiting rotation thereof as it is received in an antirotation groove in said valve housing.

9. An automatic flow control valve comprising:

a generally cylindrical valve housing having an upstream end and a downstream end and having a reduced bore section intermediate said ends;

said reduced bore section defined by an upstream surface, a downstream surface and an inner surface; a flow control set slidably received by said inner surface, said set including a first cup and an outer sleeve;

said first cup having a cylindrical portion which includes at least one port hole of predetermined configuration for passage of fluid from the outside to the inside thereof;

said outer sleeve having generally cylindrical shape disposed about said cylindrical portion of said cup and having at least one port hole of predetermined configuration which overlaps at least partially with said port hole of said first cup according to a predetermined arrangement so that fluid can flow through said holes;

a range spring disposed between said downstream end and said set for biasing said set upstream;

means to fixedly secure said first cup and said sleeve in fixed radial relationship with one another so that said cup and said sleeve can be positioned in predetermined relative orientations to adjust the degree of overlap of said port holes;

wherein said means to fixedly secure include means responsive to operator manipulation to vary the orientation of said sleeve with respect to said cup so as to adjust the degree of overlap of said port holes;

wherein said at least one port hole of said sleeve and said cup respectively include at least one fixed port hole and at least one throttling port hole;

wherein said plurality of predetermined relative orientations are in rotational offset from each other, and said varying means is operative to rotate one of said outer sleeves and said cup relative to the other;

wherein said varying means comprises:

a center pin axially inserted through said cup and said second cup; said pin being loosely engaged with said cup in a guided relationship, and fixedly engaged relative to said inner cup;

a pin retainer ring through which a portion of said center pin outside of said cup is fixedly engaged and operative to be rotationally driven via gear teeth extending therefrom; and a turndown shaft having circulatory arranged teeth for engaging said teeth on said peripheral structure of said pin retainer ring, whereby rotation of said turndown shaft responsive to an external force caused a corresponding rotation of said pin retainer ring and thus the center pin, resulting in rotation of said inner sup relative to said outer sleeve whereby the selected flow rate is maintained and effected by the rotational position of said turndown shaft.

10. An automatic flow control valve as recited in claim 9, wherein said at least one port hole means of said outer sleeve and port hole means of said inner cup respectively include at least one fixed port hole and at least one throttling port hole; said throttling port hole having varying spatial openings per unit length along the axial direction of said valve.

11. An automatic flow control valve comprising:

a generally cylindrical valve housing having an upstream end and a downstream end and having a reduced bore section intermediate said ends;

said reduced bore section defined by an upstream surface, a downstream surface and an inner surface; a flow control set slidable received by said inner surface, said set including a first cup and an outer sleeve;

said first cup having a cylindrical portion which includes at least one port hole of predetermined configuration for passage of fluid from the outside to the inside thereof;

said outer sleeve having generally cylindrical shape disposed about said cylindrical portion of said cup and having at least one port hole of predetermined configuration which overlaps at least partially with said port hole of said first cup according to a predetermined arrangement so that fluid can flow through said holes;

a range spring disposed between said downstream end and said set for biasing said set upstream;

means to fixedly secure said first cup and said sleeve in fixed radial relationship with one another so that said cup and said sleeve can be positioned in predetermined relative orientations to adjust the degree of overlap of said port holes;

wherein said means to fixedly secure include means responsive to operator manipulation to vary the orientation of said sleeve with respect to said cup so as to adjust the degree of overlap of said port holes;

further including a spring adjuster means for adjusting the preload of said range spring via an external wrench.

12. An automatic flow control valve comprising:

a generally cylindrical valve housing having an upstream end and a downstream end and having a reduced bore section intermediate said ends;

said reduced bore section defined by an upstream surface, a downstream surface and a bearing surface;

a flow control set slidably received by said bearing surface, said set including first and second cups;

said first cup having a cylindrical portion having at least one port hole of predetermined configuration for passage of fluid from the outside to the inside thereof;

said second cup having a generally cylindrical shape about said cylindrical portion of said first predetermined configuration overlapping at least partially with said port hole of said first cup according to a predetermined arrangement so that fluid can flow through said holes;

a range spring disposed between said downstream end and said set for biasing said set upstream;

means fixedly securing said first cup and said second cup in fixed radial relationship with one another so that said first and second cups can be positioned in predetermined relative orientations to adjust the degree of overlap of said port holes;

wherein said means to fixedly secure include means responsive to operator manipulation to vary the orientation of said first cup with respect to said second cup so as to adjust the degree of overlap of said port holes.

13. The valve of claim 12, wherein an outward flange is formed on the downstream end of said second cup and said range spring engages said flange.

14. An automatic flow control valve comprising:

a generally cylindrical valve housing having an upstream end and a downstream end and having a reduced bore section intermediate said ends;

said reduced bore section defined by an upstream surface, a downstream surface and a bearing surface;

a flow control set slidably received by said bearing surface, said set including first and second cups;

said first cup having a cylindrical portion having at least one port hole of predetermined configuration for passage of fluid from the outside to the inside thereof;

said second cup having a generally cylindrical shape about said cylindrical portion of said first predetermined configuration overlapping at least partially with said port hole of said first cup according to a predetermined arrangement so that fluid can flow through said holes;

a range spring disposed between said downstream end and said set for biasing said set upstream;

means fixedly securing said first cup and said second cup in fixed radial relationship with one another so that said first and second cups can be positioned in predetermined relative orientations to adjust the degree of overlap of said port holes;

wherein said means to fixedly secure include means responsive to operator manipulation to vary the orientation of said first cup with respect to said second cup so as to adjust the degree of overlap of said port holes;

wherein an outward flange is formed on the downstream end of said second cup and said range spring engages said flange;

wherein said bearing surface is formed with an annular groove and a ring member of corrosive resistant material is positioned in said groove.

15. The valve of claim 14 wherein said ring is split for ease of insertion into said groove and said ring provides a sliding contact with said first cup.

* * * * *